United States Patent [19]

Chudy et al.

[11] Patent Number: 4,495,420
[45] Date of Patent: Jan. 22, 1985

[54] MULTILAYER SCINTILLATION CHAMBER FOR THE SIMULTANEOUS MEASUREMENT OF RADIOACTIVE SAMPLES

[75] Inventors: Martin Chudy; Rudolf Janik; Pavol Povinec, all of Bratislava, Czechoslovakia

[73] Assignee: Univerzita Komenskeho, Bratislava, Czechoslovakia

[21] Appl. No.: 372,526

[22] Filed: Apr. 28, 1982

[51] Int. Cl.³ .............................................. G01T 1/20
[52] U.S. Cl. ..................................... 250/367; 250/328
[58] Field of Search ................... 250/361 R, 366, 367, 250/428, 432 R, 435, 328

[56] References Cited

U.S. PATENT DOCUMENTS 3,169,187  2/1965  Stone et al. .......................... 250/435
3,825,758  7/1974  Miraldi ................................. 250/367
3,944,832  3/1976  Kalish .................................. 250/367

Primary Examiner—Janice A. Howell

[57] ABSTRACT

Process of and apparatus for the simultaneous determination of the concentration of a plurality of radioactive gases. Radioactive gas containing several beta radionuclides is led into a separate chamber where their concentration is determined simultaneously and selectively by using a plastic multi-layer scintillator. The energy of the emitted beta radiation further identifies single radionuclides, and it determines them selectively and quantitatively by carrying out an amplitude discrimination of the registered impulses. The process can be carried out continuously or discontinuously. The multi-layer scintillation chamber is composed of a light-tight casing in which plates of plastic scintillators having suitable dimensions and location are placed in spaced relationship, such plates being connected on each end of the casing with a photomultiplier through a light-guide.

2 Claims, 1 Drawing Figure

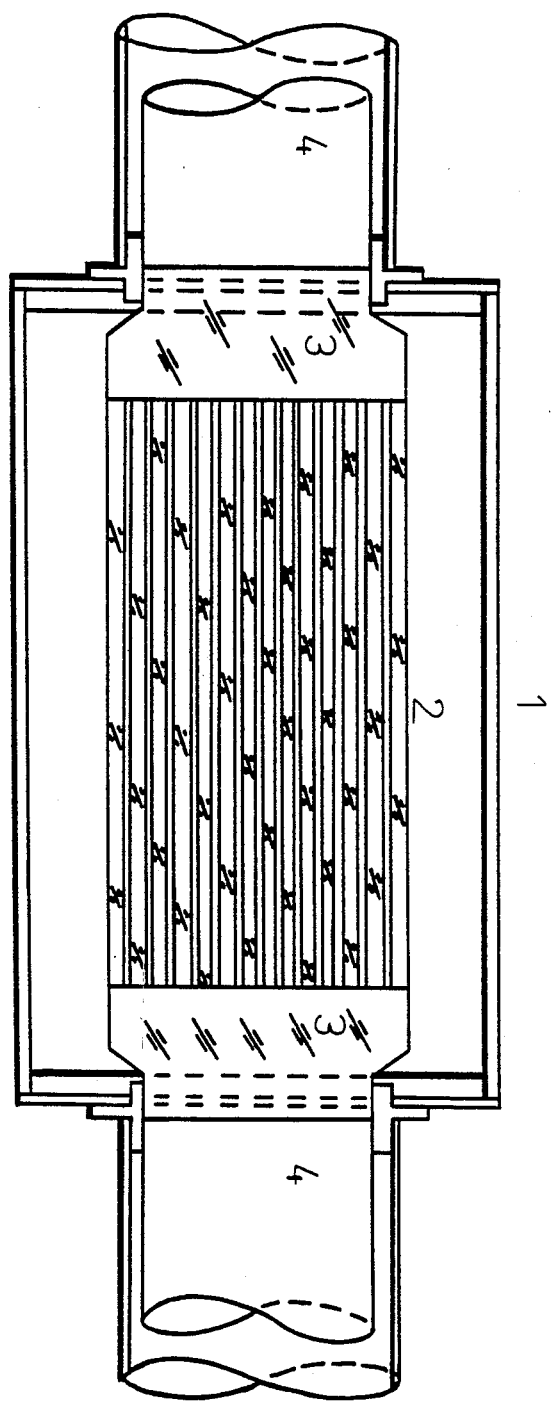

MULTILAYER SCINTILLATION CHAMBER FOR THE SIMULTANEOUS MEASUREMENT OF RADIOACTIVE SAMPLES

The invention relates to a process of and an apparatus for the simultaneous determination of the concentration of a plurality of radioactive gases by using a multi-layer scintillation chamber, such chamber employing plastic scintillators, light-guides, photomultipliers and an electronic apparatus for the registration of the nuclear radiation originating with the radioactive transformation of nuclides. It allows the selective determination of the concentration of several radionuclides simultaneously, such as for example, the determination of $3_H$, $14_C$, $18_F$, $35_S$, $36_{Cl}$, $41_{Ar}$, $133_{Xe}$, $135_{Xe}$, and $222_{Rn}$ concentration in the atmosphere of operating spaces of nuclear equipment.

Either gas or scintillation detectors are used up to now for the quantitative determination of the concentration of radionuclides in the atmosphere of nuclear equipment, in chimneys, in a gaseous cooling agent, and the like. It is usually desirable, for example, in the operation of nuclear equipment, to follow the concentration of several radionuclides simultaneously, which radionuclides have various disintegration characteristics, that is, the type of radioactive decay, the half-life period of decay, and the energy of radiation. For example, in the operating space around a light-aqueous nuclear reactor, it is thus desirable to follow the concentration of $3_H$, $85_{Kr}$, $133_{Xe}$, $135_{Xe}$ as well as that of further radionuclides. This problem has been solved up to now in a way in which several detectors were employed, each of the detectors being set up for the registration of a single, predetermined radionuclide. For example, it is possible to use an ionization chamber as a detector $3_H$ and a plastic scintillation detector with beta radiation, or a scintillation NaI/Tl/ detector with gamma radiation can be used for the above-cited rare gases. Other types of detectors can also be combined. Ionization chambers for the registration of $3_H$ are the most suitable for routine determination; they have, however the drawback that they cannot determine $3_H$ in the presence of other radioactive gases. For these purposes it is possible also to use plastic scintillation detectors. These detectors have been used up to now for the registration of only one type of radionuclide, for example $3_H$, respectively, $85_{Kr}$. Such solution is, however, disadvantageous because it requires the employment of more detectors and electronic apparatus, and thus also more complicated service by attendants.

The drawbacks mentioned are eliminated by a process for the determination of the concentration of radioactive elements by using a multi-layer scintillation chamber according to the invention employing electronic apparatus, which process is carried out continuously or discontinuously. In accordance with the invention, when the fed gas contains several beta radionuclides, the beta radionuclides are identified spectrometrically by the energy of their emitted beta radiation upon their total absorption, and their quantity is selectively and simultaneously determined by carrying out the amplitude discrimination of the registered impulses.

In a multi-layer scintillation chamber employed in carrying out the process of the invention plates of plastic scintillators having suitable dimensions and location are placed in a light-tight casing, such plates being connected with photomultipliers on each end of the casing by the use of light-guides. The invention utilizes the fact that the plastic scintillation detector is able to resolve beta particles according to their energy, that is, it operates as a spectrometer. It is only necessary to choose the thickness of the scintillator such that total absorption of the investigated beta particles will take place in the scintillator. When the maximum energies of the beta particles are sufficiently different in the radionuclides being monitored, they can be resolved by a plastic scintillation detector according to the amplitude of registered impulses.

The multi-layer scintillation chamber and the process for the simultaneous determination of the concentration of radioactive elements fulfills criteria for the simultaneous determination of the concentration of several radionuclides below the level of their maximum admissible concentration, and the chamber can operate either with continuous gas flow or under static gas conditions.

In the accompanying drawing:

The single FIGURE is a view partially in side elevation and partially in longitudinal axial section of a multi-layer scintillation chamber in accordance with the invention.

The illustrative multi-layer scintillation chamber employs plates of plastic scintillators 2 disposed in a light-guiding casing 1. The scintillators are connected at each end of the casing through a light-guide 3 with a photomultiplier 4.

EXAMPLE

In this example there was employed a scintillation chamber for the simultaneous determination of the concentration of $3_H$, $133_{Xe}$, $85_{Kr}$ and $135_{Xe}$ in air. Such multi-layer scintillation chamber for the simultaneous determination of the concentration of the above radionuclides having the maximum energy of beta particles between 10 and 100 keV had the following optimum perameters:

14 plates of plastic scintillator having a size of $200 \times 100 \times 4.2$ mm were placed one above the other with a spacing between plates of 3.3 mm. The thus formed sensitive gas-receiving chamber space was 0.95 l. Light was collected from the shorter sides of the plates from an area of $10 \times 11$ cm by employing light-guides 3. The measuring chamber 1 was formed by an aluminum casing together with photomultipliers and preamplifiers. The detection part formed a separate unit which was connected to the inlet of measured gaseous medium and to an electronic detecting apparatus. The signals from the photomultipliers were summed after fast coincidence, amplified, and analyzed using a multi-channel amplitude analyzer. A reversional counter allowed the use of a compensation connection of the chamber; such connection suppressed the influence of an external field of gamma radiation.

The electronic detection mechanism employed was a four-channel version for the simultaneous monitoring of $3_H/$ the maximum energy of beta radiation $E_{max} = 18.6$ keV/, $133_{Xe}/E_{max} = 346$ keV/, $85_{Kr}/E_{max} = 670$ keV/, $135_{Xe}/E_{max} = 190$ keV/ in the atmosphere. The concentrations of the determined radionuclides, related to the rates in the single channels, were calculated according to the relations:

$$A_i = \sum_{j=1}^{n} k_{ij} \cdot N_j, \; i = 1, 2, \ldots n,$$

wherein $A_i$ is the specific activity of the i-th nuclide, $N_j$ is the pulse rate in the j-th channel of amplitude analyzer, $k_{ij}$ is the coefficient which is determined by calculations from the counting efficiency of radiation of the i-th nuclide in the j-th channel, and n is the number of radionuclides in the analyzed medium.

Radioactive emitters decaying by K-capture were used for energy calibration. The experimentally found detection limit for $3_H$ is equal to 20 Bq.m$^{-3}$, and 1 kBq.m$^{-3}$ of air for $133_{Xe}$, $85_{Kr}$ and $135_{Xe}$ expressed as the minimum measurable concentration for single radionuclides which can be determined within 100 s of measuring when we require a signal count which exceeds twice the statistic deviation of the background where the criterion is 2 sigma. The values presented are at least by one order lower than the maximum admissible concentrations of these radionuclides in the air.

Although the invention is illustrated and described with reference to one preferred embodiment thereof, it is to be expressly understood that it is in no way limited to the disclosure of such preferred embodiment but is capable of numerous modifications within the scope of the appended claims.

We claim:

1. A multilayer scintillation chamber adapted for the simultaneous measurement of radionuclides emitting beta-radiation, comprising a light-tight casing, a plurality of layers of plastic scintillation plates disposed in spaced parallel relationship in said light-tight casing, and two photomultipliers, the ends of said plates being optically coupled through light guides to said photomultipliers, said chamber further comprising electronic circuits for selecting only those events in which output pulses from the two photomultipliers are in coincidence, and in which the amplitudes of said pulses correspond to the maximum energies of registered beta-particles of measured beta-radionuclides in said plastic scintillation plates.

2. A multilayer scintillation chamber as claimed in claim 1, adapted for the measurement of radioactivity of a fluid sample flowing therethrough.

* * * * *